Jan. 3, 1956 L. E. HAMILTON, SR., ET AL 2,729,517
SAFETY ROOF BRACKET
Filed Nov. 16, 1951
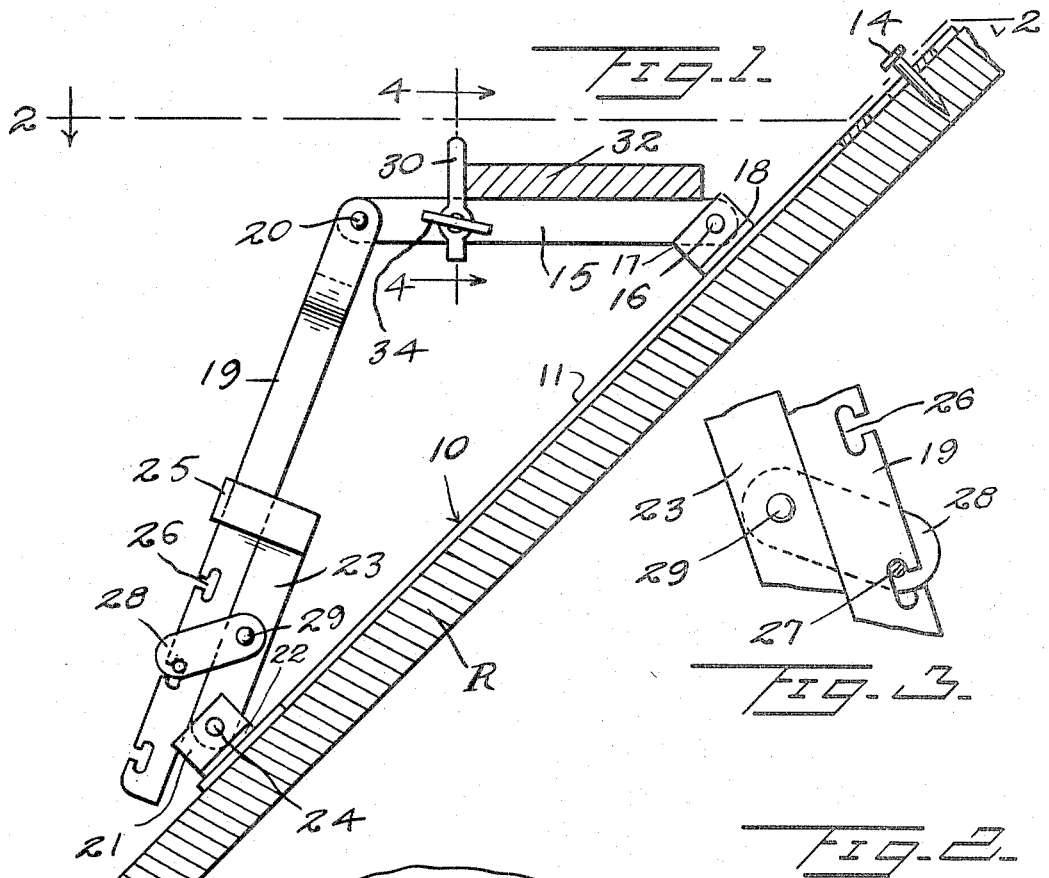
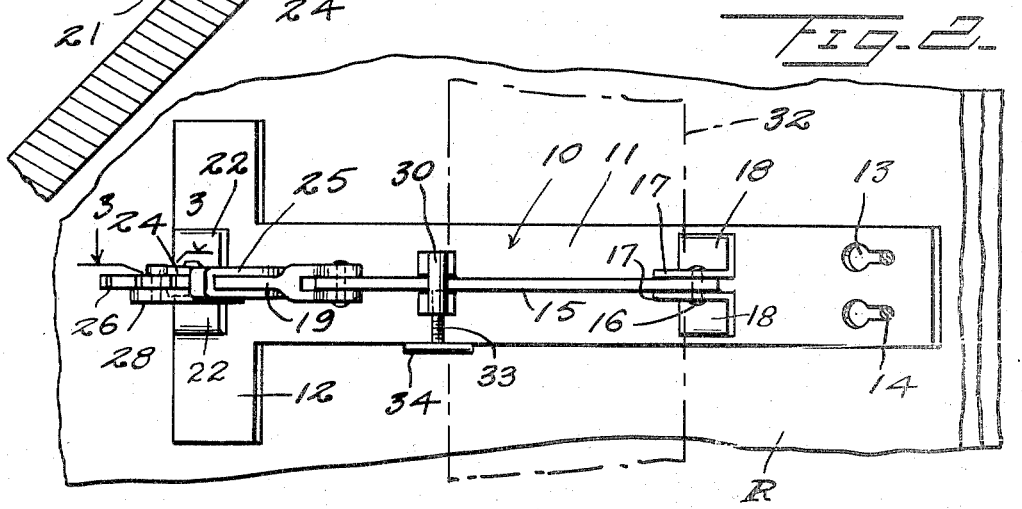
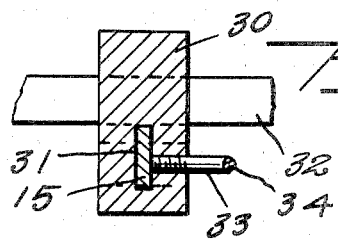
INVENTORS
L. E. Hamilton, Sr.
George D. MacKenzie
BY Kimmel & Crowell
ATTORNEYS

United States Patent Office 2,729,517
Patented Jan. 3, 1956

2,729,517

SAFETY ROOF BRACKET

Liday Elury Hamilton, Sr., Maitland, Fla., and George D. MacKenzie, Oshawa, Ontario, Canada Application November 16, 1951, Serial No. 256,747

1 Claim. (Cl. 304—20)

This invention relates to safety brackets for mounting on a roof.

An object of this invention is to provide a bracket adapted to be positioned on a slanted roof for holding a horizontal board or platform so that workman may safely work on the roof.

Another object of this invention is to provide a bracket which can be easily and quickly adjusted for any inclination of the roof.

A further object of this invention is to provide in a roof bracket an improved locking means for the extensible leg thereof which will firmly hold the extensible leg in adjusted position.

With the above and other objects in view, our invention consists in the arrangement, combination and details of construction disclosed in the drawings and specification, and then more particularly pointed out in the appended claim.

In the drawing:

Figure 1 is a detailed side elevation of a roof bracket partly broken away and in section showing the device mounted on a slanting roof.

Figure 2 is a sectional view taken on the line 2—2 of Figure 1.

Figure 3 is a fragmentary sectional view taken on the line 3—3 of Figure 2.

Figure 4 is a sectional view taken on the line 4—4 of Figure 1.

Referring to the drawing, the numeral 10 designates generally a base member which, in the applied position of the bracket, is adapted to be disposed on the outer side of roof R. The base member 10 is constructed from a flat piece of metal and includes an elongated flat bar 11 which is formed with a transversely disposed head 12 at the lower end thereof. The bar 11 adjacent the upper end thereof is formed with a pair of key-hole openings 13 through which nails or other headed fastening members 14 are adapted to be extended so as to securely dispose the bar 11 on the outer side of the roof R. An upper platform supporting link 15 is pivotally secured to the bar 11 adjacent the upper end of the latter, and one end of the link or platform supporting member 15 is pivotally mounted on a pivot member 16 extending between a pair of ears 17 having right angle base members 18 secured to the outer side of bar 11.

An extension bar 19 is pivotally secured as at 20 to the outer end of link or bar 15 and projects downwardly toward the head 12. The head 12 has secured to the outer side thereof a pair of spaced ears 21 having base members 22 which are secured as by welding or the like to the head 12. An elongated bar 23 is pivotally secured as at 24 between the ears 21, and bar 23 is formed with a guide loop 25 through which the extensible bar 19 slidably engages. The outer edge of bar 19 is formed with a plurality of spaced T-shaped slots 26 within a selected one of which a headed locking member 27 is adapted to engage.

The locking member 27 is fixed to a short link 28 pivotally mounted as at 29 on the bar 23. The upper platform supporting link 15 has adjustably mounted thereon a stop member 30, which is formed with an opening 31 through which the link or supporting member 15 slidably engages. The stop member 30 extends above the upper edge of supporting member 15 for a substantial distance and a board or platform element 32 which is resting on the link 15 is adapted to butt against the upstanding stop member 30. The stop member 30 is adjusted along the length of the supporting link or member 15 by means of a set screw 33 which is formed with a head or wing 34. The set screw 33 is, as shown in Figure 4, adapted to bind against one side of the link or supporting member 15.

In the use and operation of this bracket structure, the base member 10 is disposed on the outer side of the roof R and is held against sliding movement on the roof by means of the fastening members 14, which are extended through the key hole openings 13. The platform supporting member 15 is adjusted so as to be in substantially a horizontal position by initially moving link 19 upwardly a slight distance so that the shank of the locking member 27 will be disposed in registry with the stem portion of the T slot 26. The link 28, carrying the locking bolt 27, may then be swung upwardly and outwardly so that the link 19 may be freely adjusted up or down to thereby dispose the platform supporting member 15 in substantially a horizontal position. When member 15 is in a substantially horizontal position, link 28 is swung downwardly and inwardly so as to move the locking bolt 27 inwardly into an adjacent T slot 26. When weight is placed on supporting member 15 and link 19, bolt 27 will be disposed in the upper end of the head of the T slot 26, as shown in Figure 3. The planks or platform members 32 may then be disposed on the now horizontal supporting member 15, and stop member 30 may be adjusted by the set screw 33 so as to bear against the outer edge of the plank or platform member 32.

What is claimed is:

A roof bracket comprising an elongated flat bar adapted to rest on a slanting roof, said bar having a pair of key-hole openings adjacent the upper end thereof for receiving fastening members, a cross head at the lower end of said bar, an upstanding bracket on said cross head, a second bracket on said bar at an intermediate point thereof, a platform-supporting link pivotally secured at one end to said second bracket, a bracing link pivotally secured at one end to the outer end of said platform-supporting link, a short link pivotally secured at one end to said first-mentioned bracket, a guide loop carried by said short link engaging about said bracing link, said bracing link having spaced inverted T-shaped keeper slots in the outer edge thereof, a locking link pivotally mounted on said short link, said link having a cross pin engageable in a selected keeper slot, a platform abutment comprising a second loop surrounding said platform-supporting link for sliding movement thereon, an upstanding lug carried by said loop engageable against the edge of said platform and screw means extending through a side of said second loop securing said abutment in adjusted position on said platform-supporting link.

References Cited in the file of this patent

UNITED STATES PATENTS

| | | |
|---|---|---|
| 362,747 | Higgins | May 10, 1887 |
| 380,395 | Kramer | Apr. 3, 1888 |
| 1,028,362 | King | June 4, 1912 |
| 1,042,192 | Boilot | Oct. 22, 1912 |
| 1,456,940 | Showalter | May 29, 1923 |
| 2,388,420 | Kott | Nov. 6, 1945 |
| 2,426,825 | Geary | Sept. 2, 1947 |
| 2,496,556 | Nelson | Feb. 7, 1950 |